United States Patent
Rezaiifar et al.

(10) Patent No.: US 9,131,420 B2
(45) Date of Patent: Sep. 8, 2015

(54) PILOT SIGNAL SET MANAGEMENT IN A MULTI-CARRIER COMMUNICATION SYSTEM

(71) Applicant: QUALCOMM Incorporated, San Diego, CA (US)

(72) Inventors: Ramin Rezaiifar, San Diego, CA (US); Christopher Gerard Lott, San Diego, CA (US); Donna Ghosh, San Diego, CA (US); Peter John Black, San Diego, CA (US); Rashid Ahmed Akbar Attar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 71 days.

(21) Appl. No.: 14/050,008

(22) Filed: Oct. 9, 2013

(65) Prior Publication Data
US 2014/0036875 A1     Feb. 6, 2014

Related U.S. Application Data

(63) Continuation of application No. 12/466,698, filed on May 15, 2009, now Pat. No. 8,605,801.

(60) Provisional application No. 61/054,762, filed on May 20, 2008.

(51) Int. Cl.
| | | |
|---|---|---|
| *H04W 36/04* | (2009.01) | |
| *H04W 36/18* | (2009.01) | |
| *H04W 16/02* | (2009.01) | |
| *H04W 36/30* | (2009.01) | |

(52) U.S. Cl.
CPC ............. *H04W 36/18* (2013.01); *H04W 16/02* (2013.01); *H04W 36/04* (2013.01); *H04W 36/30* (2013.01)

(58) Field of Classification Search
CPC ..... H04W 16/02; H04W 36/04; H04W 36/18; H04W 36/30
USPC .................................................. 375/260, 267
See application file for complete search history.

(56) References Cited

U.S. PATENT DOCUMENTS

| | | | | |
|---|---|---|---|---|
| 6,285,655 | B1* | 9/2001 | Lundby et al. | ................. 370/209 |
| 6,289,221 | B1* | 9/2001 | Ritter | ............................ 455/447 |

(Continued)

FOREIGN PATENT DOCUMENTS

| | | |
|---|---|---|
| JP | 2002095031 A | 3/2002 |
| JP | 2002523995 A | 7/2002 |

(Continued)

OTHER PUBLICATIONS

International Search Report and Written Opinion—PCT/US2009/044745, International Search Authority—European Patent Office—Sep. 22, 2009.

(Continued)

*Primary Examiner* — David B. Lugo
(74) *Attorney, Agent, or Firm* — Kevin T. Cheatham

(57) ABSTRACT

In a wireless communication system where different frequency bands are deployed to generate various communication zones, pilot signal set management for a plurality of pilot signals generated from an additional coverage zone is based on identifying a preselected signal set from the plurality of pilot signals and determining whether a predetermined criterion is met.

50 Claims, 6 Drawing Sheets

(56) References Cited

U.S. PATENT DOCUMENTS

| | | |
|---|---|---|
| 6,430,168 B1 | 8/2002 | Djurkovic et al. |
| 6,535,738 B1 | 3/2003 | Bomar et al. |
| 6,674,966 B1 * | 1/2004 | Koonen .................. 398/70 |
| 6,721,351 B1 | 4/2004 | Lee et al. |
| 7,072,663 B2 | 7/2006 | Ramos et al. |
| 7,251,490 B2 | 7/2007 | Rimoni |
| 7,929,970 B1 * | 4/2011 | Gunasekara et al. ......... 455/444 |
| 8,145,221 B2 | 3/2012 | Garg et al. |
| 8,150,408 B2 | 4/2012 | Rezaiifar et al. |
| 2004/0116143 A1 | 6/2004 | Love et al. |
| 2005/0020203 A1 | 1/2005 | Losh et al. |
| 2006/0252428 A1 | 11/2006 | Agashe et al. |
| 2007/0066232 A1 | 3/2007 | Black |
| 2007/0140185 A1 | 6/2007 | Garg et al. |
| 2009/0129336 A1 | 5/2009 | Osborn |
| 2009/0215400 A1 | 8/2009 | Chang et al. |
| 2009/0290652 A1 | 11/2009 | Rezaiifar et al. |
| 2010/0120437 A1 * | 5/2010 | Foster et al. ................. 455/444 |

FOREIGN PATENT DOCUMENTS

| | | |
|---|---|---|
| JP | 2003522443 A | 7/2003 |
| JP | 2003525533 A | 8/2003 |
| JP | 2006025432 A | 1/2006 |
| JP | 2007195247 A | 8/2007 |
| KR | 20080004591 A | 1/2008 |
| RU | 2277762 C2 | 6/2006 |
| RU | 2006101331 A | 6/2006 |
| WO | 0011895 A1 | 3/2000 |
| WO | 0038456 A1 | 6/2000 |
| WO | 0105179 A1 | 1/2001 |
| WO | 2006096764 A2 | 9/2006 |
| WO | 2006110875 A1 | 10/2006 |
| WO | 2007038358 A2 | 4/2007 |

OTHER PUBLICATIONS

Taiwan Search Report—TW098116773—TIPO—Jan. 21, 2013.

* cited by examiner

PILOT SIGNAL SET MANAGEMENT IN A MULTI-CARRIER COMMUNICATION SYSTEM

CROSS-REFERENCE TO RELATED APPLICATIONS

The present application is a continuation of U.S. patent application Ser. No. 12/466,698, entitled "PILOT SIGNAL SET MANAGEMENT IN A MULTI-CARRIER COMMUNICATION SYSTEM," filed May 15, 2009, which issued as U.S. Pat. No. 8,605,801 on Dec. 10, 2013, and which claims priority to U.S. Provisional Patent Application Ser. No. 61/054,762, entitled "HAND-IN AND HAND-OUT PROCEDURES IN A MULTI-CARRIER COMMUNICATION SYSTEM," filed May 20, 2008, which are both assigned to the assignee hereof and the contents of which are both hereby expressly incorporated by reference in their entirety.

FIELD

The present invention generally relates to communications, more particularly, concerns with pilot signal set management for non-uniform, multi-carrier communication systems.

BACKGROUND

In wireless networks, such as a wireless cellular network, network operators normally deploy a minimum amount of bandwidth to provide service coverage to end users for a designated geographical area. The aforesaid minimum amount of bandwidth is sometimes referred to as the coverage carrier. As user demand increases, the network operators add additional bandwidth to increase capacity to meet the demand. The additional bandwidth is sometimes referred to as the capacity carrier. To meet still more user demand, more than one capacity carriers can be additionally deployed. The capacity carriers can be arranged to cover the entire geographical area, or alternatively, on a site-by-site basis. For the latter, additional coverage zones, sometimes referred to as hot spots, are created to provide coverage extension and capacity. The inclusion of the hot spots results in a non-uniform, multi-carrier deployment communication network.

Hot spots can be created in accordance with demand as aforementioned. Nevertheless, these hot spots are often served with more than one carrier frequencies. As such, user devices need to be capable of transitioning among the different frequencies. Heretofore, there has not been any satisfactory scheme to provide any seamless transitions. For example, in a typical inter-frequency handoff by a single-carrier device, it requires a break of the existing communication session carried by one frequency before the communication device is able to resume the communication session carried by another frequency. Such transitions can result in loss of data. Furthermore, the interrupted transitions may negatively impact user experience.

Accordingly, there is a need to provide a seamless transition from one frequency to another in a multi-carrier communication system.

SUMMARY

In a wireless communication system where spatially non-uniform frequency channels are deployed to generate various communication zones, pilot signal set management for a plurality of pilot signals generated from an additional coverage zone is based on identifying a preselected signal set from the plurality of pilot signals and determining whether a predetermined criterion is met. The wireless communication system can be in the form of a cellular wireless system with various configurations. One such configuration may comprise macro-cells with the same number of carriers, macro-cells with a non-uniform number of carriers, or a heterogeneous deployment with a combination of macro-cells, pico-cells, remote radio-heads, repeaters, etc. The invention can be embodied as hardware and software in different communication entities.

These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Furthermore, in the following description, for reasons of conciseness and clarity, terminology associated with the 1x Evolved Data Optimized (1xEV-DO) standards, as promulgated under the $3^{rd}$ Generation Partnership Project 2 (3GPP2) by the International Telecommunication Union (ITU) is used. It should be emphasized that the invention is also applicable to other technologies, such as technologies and the associated standards related to Wideband Code Division Multiple Access (WCDMA), Time Division Multiple Access (TDMA), Orthogonal Frequency Division Multiple Access (OFDMA), and so forth. Terminologies associated with different technologies can vary. For example, depending on the technology considered, the Access Terminal (AT) used in 1xEV-DO standards can sometimes be called a mobile station, a user terminal, a subscriber unit, a user equipment, etc., to name just a few. Likewise, the Access Node (AN) used in 1xEV-DO standards can sometimes be called an access point, a base station, a Node B, and so forth. It should be noted here that different terminologies apply to different technologies when applicable.

Figure 1:
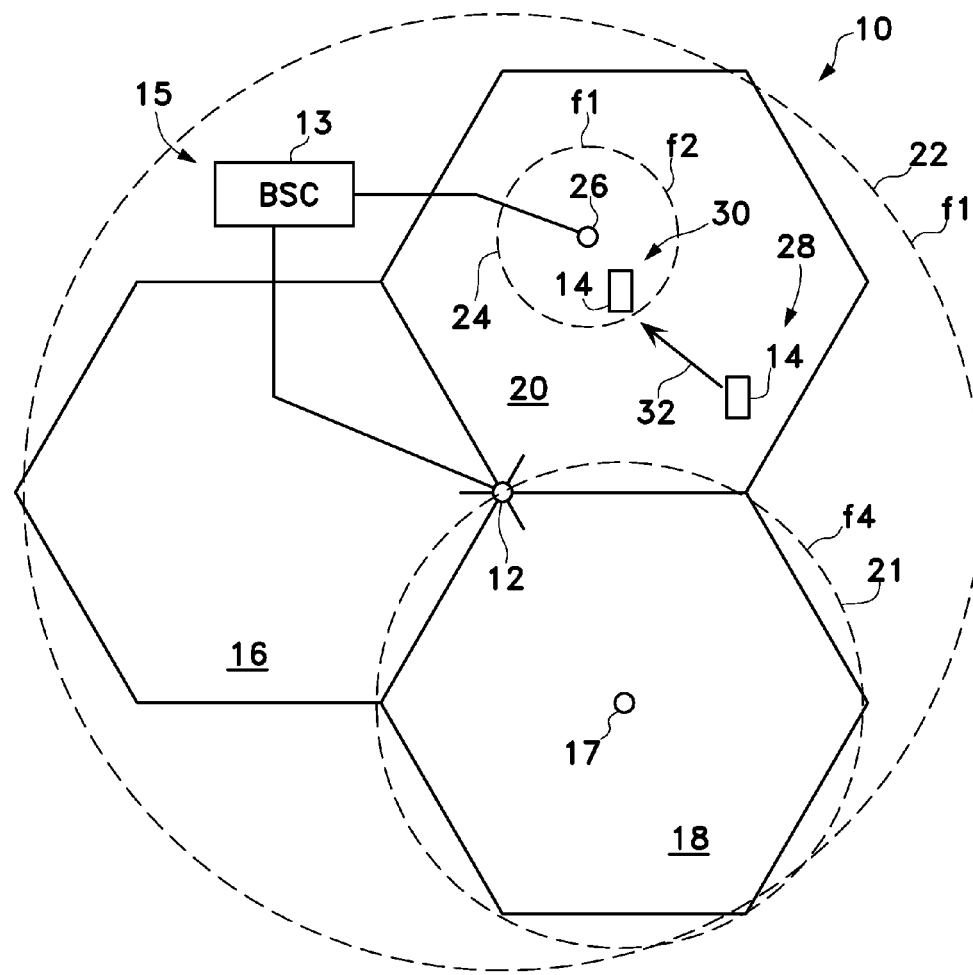
FIG. 1 is a schematic drawing which shows a network with a heterogeneous deployment arranged in accordance with an exemplary embodiment of the invention.

Network deployments are normally tailored to user demand. For example, as demand increases, network operators can add additional hardware or bandwidth to existent networks. Hardware addition can be in the form adding additional coverage zones. Such zones can be generated by cell splitting, or deployment of additional network nodes which assume various names such as hot-spots, pico-cells, femto-cells, repeaters, etc. A network arrangement with the aforementioned additional bandwidth or hardware nodes is commonly referred to as a heterogeneous deployment. FIG. 1 is a simplified drawing, not drawn to scale but rather as a schematic representation, which shows a network with a multi-carrier, heterogeneous deployment arranged in accordance with an exemplary embodiment of the invention.

In FIG. 1, the overall multi-carrier communication system is signified by the reference numeral 10. In the system 10, there is an infrastructure entity, called a base station 12, which basically is a terrestrial station having a transceiver capable of wireless communications with multiple ATs, one of which is shown as an AT 14 in FIG. 1. The base station 12 is controlled by yet another infrastructure communication entity, called a Base Station Controller (BSC) 13. The BSC 13 can control more than one communication entity, such as the base station 12 shown in FIG. 1. Hereinbelow, the BSC 13 coupled with the other communication entities, such as the base station 12, is collectively called the Access Network (AN) 15.

The base station 12 in this example provides wireless communication coverage to three sectors, namely, sectors 16, 18 and 20. Each of the sectors 16, 18 and 20 is assigned a unique PN (Pseudo-random Noise) sequence for communications with the subscribers, as operated under the 1xEV-DO standards.

As mentioned earlier, to increase data throughput and minimize signal interference, the base station 12 can be a multi-carrier base station. That is, the base station 12 and other infrastructure entities in the network 100 can communicate with the ATs, such as the AT 14, via more than one frequency band. In this specification and the appended claims, the term "multi" means more than one.

Figure 2:
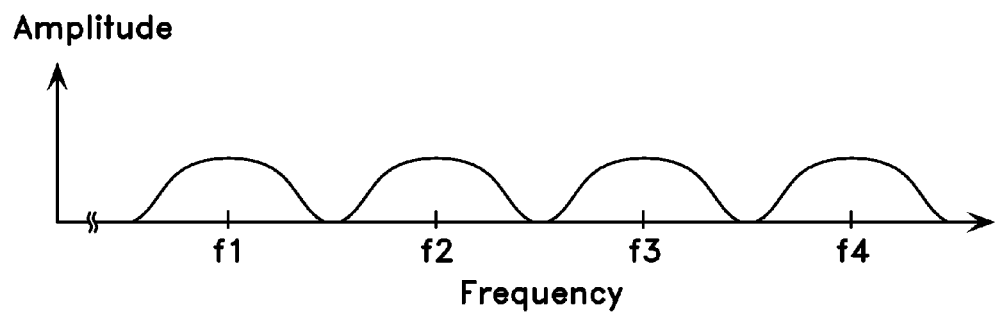
FIG. 2 is a graphical representation of a spectrum of frequency bands available to a network operator in the exemplary embodiment.

FIG. 2 graphically shows a spectrum of frequency bands available to the network operator in the system 10 as carrier frequencies for carrying data exchanged with the subscribers. For instance, as shown in FIG. 2, the operator of the network 10 is allocated 4 carrier-frequency bands with center frequencies labeled f1-f4 as shown.

In the network 10, in addition to the base station 12, the operator can also have additional coverage zones deployed as mentioned above. The additional coverage zones can be called by various names such as hot spots, pico cells, femto cells and the like. In this example, the network operation can use any of the aforementioned 4 frequency bands or combinations thereof to generate the various additional zones.

In these additional coverage zones, the operator deploys one or more carriers with reduced interference with other sectors by means of spatial reuse of frequency bands. That is, a frequency band used in one location is reused in another location if there are no other sectors, cells or additional coverage zones in the proximal neighborhood using the same frequency band.

In general, an additional coverage zone is a designated area in which an additional carrier is added on the top of at least one existent carrier which is used prior to the creation of the additional coverage zone. More than one additional carrier can be added to the additional coverage zone. Likewise, more than one existent carrier can preexist in the additional coverage zone. Furthermore, each carrier, be it additional or preexistent, can be further split and distinguished with different PN sequences. A few examples of the additional coverage zone are described below in an exemplary embodiment. It should be noted that these examples serve merely as illustrations and should not be construed as limiting.

Reference is now directed to FIG. 2 in conjunction with FIG. 1. Suppose the base station 12 generates a coverage area accessible by the ATs covering all three sectors 16, 18 and 20 using the frequency band with the center frequency at f1. Further suppose that the sector 18 falls within an urban area densely populated with subscribers. To better serve the subscribers in the sector 18, the operator allocates the frequency band with the center frequency f4 via a transceiver 17 to the sector 18 and generates an additional coverage zone 21 as shown in FIG. 1. Depending on the geographical size or the number of subscribers, various terms can be designated to the zone 21. In this example, the zone 21 is called a hot spot.

Because there are no neighboring cells or sectors that operate in the same frequency band, i.e., the frequency band centered at f4, the hot spot 21 has increased coverage for the same fixed transmit power as that of the frequency band centered at f1 in the sector 18. Phrased differently, the hot spot 21 uses the carrier frequency centered at f4 which is not used by any neighboring cells or sectors. As a result ATs using the carrier with the center frequency at f4 in exchanging data with the hot spot 21 experience lower interference and consequently higher signal to interference ratio (SINR) and data rates.

As another example, suppose within another sector 20, there is a localized region crowded with subscribers, e.g., in a shopping mall. To serve these subscribers, the operator may generate another communication coverage zone 24 within the sector 20. In this example, the zone 24 is called a pico cell 24. The pico cell 24 is said to be put into service powered by the transceiver 26 as another infrastructure communication entity and has lower transmit power than that of the sector 20 powered by the transceiver of the base station 12.

In addition to the carrier frequency band centered at f1, the pico cell 24 operates with yet another carrier frequency band centered at f2. That is, the transceiver 26 is multi-frequency transceiver. In this case, two carrier frequencies centered at f1 and f2 can be generated and processed from the transceiver 26. The transceiver 26 serves as another communication entity in the communication system 10. In this example, the transceiver 26 is also controlled by the BSC 13.

In the pico cell 24, for the same reasons as mentioned above, with no neighboring zones or cells operating in the same frequency band, i.e., the frequency band centered at f2, the pico cell 24 can have better coverage in the frequency band centered at f2 so as to avail accessibility to all subscribing users. It should be noted that in this example, the pico cell 24 is implemented to have reduced coverage in the frequency band centered at f1 as compared to that at f2. The reason is because of the existence of neighboring sector interferences, such as from sectors 16, 18 and 20, on the frequency f1 but not f2.

Because of the additional coverage zones, such as the zones 21 and 24, deployed on the top of the existent coverage area 22, the system 10 is said to have a heterogeneous deployment. There is yet another type of deployment, called the macro-cellular deployment which will be described later.

In the system 10, to efficiently utilize communication resources, it is preferable that an end user communication entity, such as the AT 14, communicates with any cell with the best signal strength. Quite often, the cell that provides the best signal strength is the cell that is closest in geographical proximity with the end user entity.

Reference is now returned to FIG. 1 in conjunction with FIG. 2. In this embodiment, the AT 14 is also capable of simultaneously processing signals carried by multi-frequency carriers, including the frequency bands centered at f1-f4 as shown in FIG. 2. The hardware architecture for the AT 14 will also be described later.

Suppose the AT 14 can roam among the various cells and sectors and is originally at a location identified by the reference numeral 28 shown in FIG. 1. At the location 28, the AT 14 is under the service coverage area of the sector 20 which operates at the frequency band centered at f1.

As mentioned earlier, the AT 14 is not designed to be stationary. When the AT 14 moves to another coverage area, the AT 14 may have to communicate with another cell or sector. To maintain quality of service, seamless transitions among the serving nodes entities are highly desirable to the user entity, such as the AT 14. That is, it is the objective of the network operator of the system 10 to provide seamless operations to the subscribers when crossing the cells and sectors. To accomplish this end, the AT 14 maintains an Active Set (ASET) in its memory, as operated under the 1xEV-DO standards. For each sector or cell with the associated carrier reachable by the AT 14 in the ASET, such as the sector 20 with the carrier frequency centered at f1 shown in FIG. 1, the cell identification and the pilot signal strength of the cell in a frequency band is kept. The information of any pilot signal reachable by the AT 14 is called a pilot signal set. Hereinbelow, the terms "pilot signal set," "pilot set," and sometimes simply "set" are used interchangeably. The information of a pilot signal set stored in the ASET of the AT 14 is called a candidate set.

A pilot signal set is added to the ASET when a predetermined criterion is met. Likewise the pilot signal set is deleted from the ASET when yet another predetermined criterion is met. For instance, when the pilot signal strength of the current cell or sector in a carrier that communicates with the AT 14 becomes weak, and the pilot signal strength of a neighboring cell or sector in a carrier of the same or different frequency reaches a predetermined threshold, the AT 14 may determine a change of serving cell or sector is in order and thereafter takes action to facilitate such a change. In a multi-carrier system, such as the system 10 shown in FIG. 1, in addition to the cell or sector and pilot signal strength information, carrier frequency information of each cell or sector needs also be included in the pilot set of the ASET, as operated under the 3GPP2 1xEV-DO air-interface standards, section 8.

Reference is returned to FIG. 1 for a specified example. As mentioned earlier, at the location 28, the AT 14 is in communication with the sector 20 which operates under the frequency band centered at f1. As such, in the ASET of the AT 14, it includes the pilot set {20, f1}. Hereinbelow, for each pilot set, the first parameter within the parentheses represents the sector or cell identification and the second parameter represents the center carrier frequency value. In the following description, for clarity and ease of description, the sector or cell identification is the reference numeral used to designate the sector or cell in the drawing figures.

The AT 14 monitors the pilot signal strength of every pilot set in its ASET, i.e., the candidate set, continuously. The candidate set is a list of sector (or cell) and frequency band pairs in the ASET relied on be the AT 14 for mobility purposes. Under the 1xEV-DO standards, the AT 14 reports the pilot signal strength values of all the pilot sets the AT 14 is capable of receiving to the AN 15 using the Route Update Protocol (RUP) message, when the pilot signal strength values exceed a certain threshold. The threshold value is configured by the AN 15. The AN 15, upon receiving the RUP message may decide to add or delete the sets in the ASET via sending a Traffic Channel Assignment (TCA) message to the AT 14. The details of these procedures are set forth in the 1xEV-DO standards section 8.

Suppose the AT 14 is approaching the pico cell 24 as indicated by the direction signified by the reference numeral 32 shown in FIG. 1. At some point in time, the AT 14 receives pilot signals from the pico cell 24, i.e., pilot signals from the transceiver 26 of the pico cell 24 operating under the frequency bands centered at f1 and f2. Under the 1xEV-DO standards, if any pilot signal of a cell reported by the AT 14 is sufficiently strong and exceeds the threshold, the AN 15 directs the AT 14 to add the cell as a candidate in the AT's ASET using the TCA message. Specifically, in this instance, the AT 14 as directed by the AN 15 should include the pilot sets {24, f1} and {24, f2} as candidate sets in its ASET.

As mentioned earlier, at a given user location, the pilot strength received by the AT 14 from the cell 24 in the frequency band centered at f2 is much higher than that in the frequency band centered at f1. This is due to the absence of possible interference with the neighboring cells on the frequency band centered at f2. Consequently, the pilot set {24, f2} can be in the ASET of the AT 14 much earlier, if the AN 15 so chooses, as compared to the other pilot set {24, f1}. This is because the pilot signal strength from the pilot set {24, f2} crosses the AN's specified threshold much earlier than corresponding pilot signal strength from the pilot set {24, f1} as the AT 14 moves in direction 32. Nevertheless, in this embodiment, upon receiving the RUP message with the aforementioned information, the AN 15 should not direct the AT 14 to add the pilot set {24, f2} to the ASET of the AT 14 when the pilot signal strength from the set {24, f2} crosses the threshold. Otherwise, the operation of the AT can be problematic. It should be noted that there are occasions that accepting the set {24, f2} at this juncture can be possible when certain condition or conditions are met, but they will be described later.

First, among other things, since the AT 14 is comparatively far away from the pico cell 24 geographically, if the AT 14 adds the pilot set {24, f2} in its ASET, the AT 14 would be subject to reverse link (RL) power control by the pico cell 24. At a far-away distance, the AT 14 as directed by the pico cell 24 may need to raise transmitting power of the RL, i.e., the communication link from the AT 14 to the pico cell 24, to a very high level. If the AT 14 transmits power on the frequency band centered at f2 is sufficiently higher than that on the frequency band centered at f2, it can result in adjacent channel interference to the other nodes (e.g., the base station 12) operating at the frequency centered at f1. It is therefore preferable that there is a constraint placed on the transmit power differential of the AT 14 across adjacent carriers. The allowable transmit power differential depends on, among other things, the network deployment and center-frequency separations of the carriers.

In this embodiment, in deciding whether to add the pilot sets {24, f2} and {24, f1} to the AT's ASET, the AN 15 relies on the weaker of the pilot signal sets {24, f1} crossing the threshold, instead of the stronger of the pilot signal sets {24, f2} crossing the threshold. That is, the predetermined criterion in this embodiment in determining whether the user entity, such as the AT 14, is in an additional coverage zone is based on whether the weaker of the pilot set meets a predetermined threshold.

Figure 3:
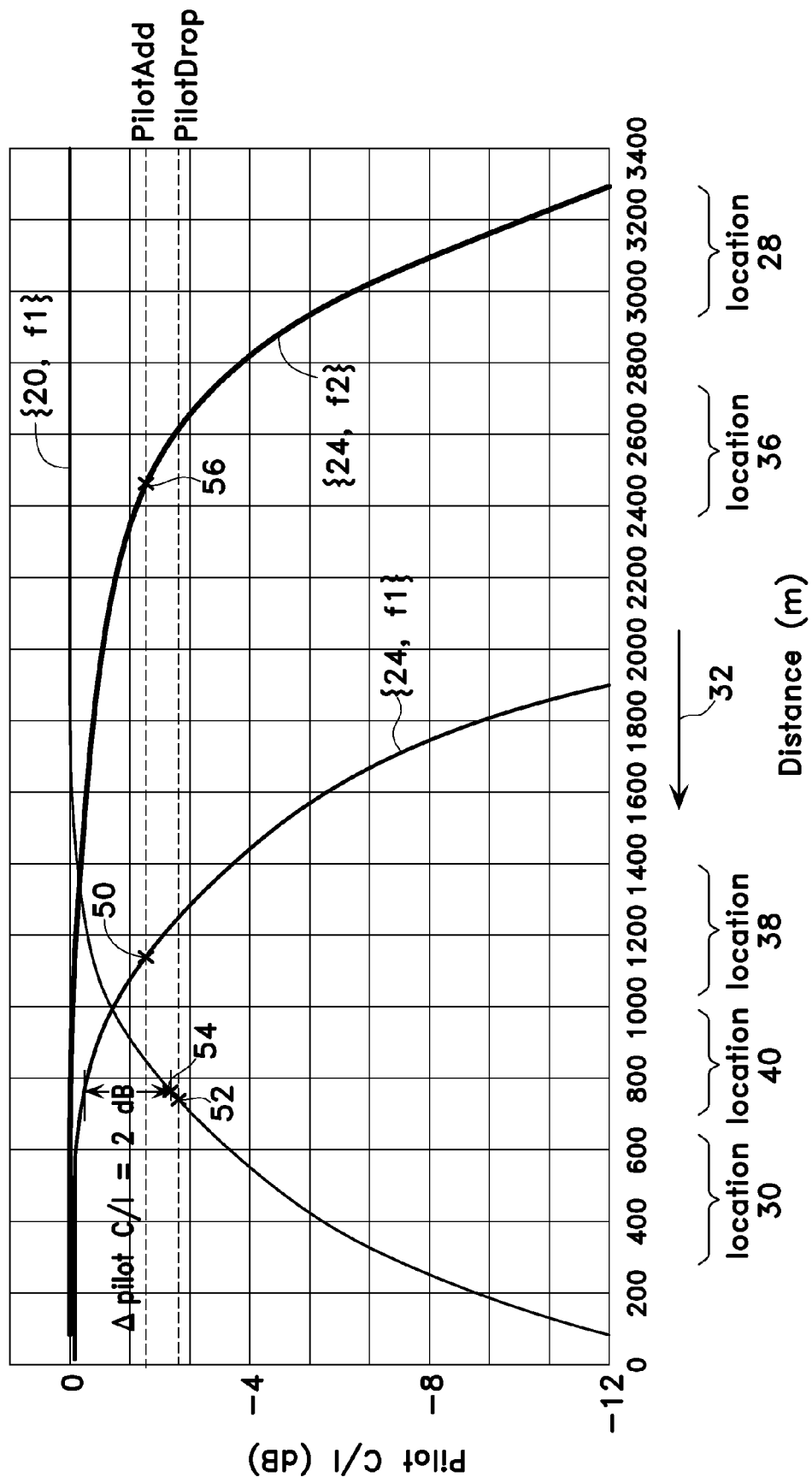
FIG. 3 is a graphical representation which shows pilot signal strength of the various communication zones in the exemplary embodiment.

Reference is now directed to FIG. 3 for a more specific example. FIG. 3 graphically shows the pilot signal strength of the various pilot sets {20, f1}, {24, f1} and {24, f2} as a function of distance away from the transceiver 26 of the Cell 24. In FIG. 3, the x-axis represents the distance in meters between the AT 14 and the transceiver 26 of the pico cell 24. The y-axis represents the pilot signal strength as pilot C/I (carrier/interference) in dB.

As described above, suppose the AT 14 is originally at the location 28. At this juncture, the pilot signal set {20, f1} is above the predetermined threshold, PilotAdd, for candidate inclusion. As such, the pilot signal set {20, f1} is in the ASET of the AT 14. In fact, in this example, at this point in time, the AT 14 is engaged in active communications with the sector 20. On the other hand, other pilot signal sets, such as the set {24, f1} which is not received by the AT 14 and the set {24, f2} which is received by the AT 14 but below the predetermined threshold for pilot inclusion, PilotAdd, are excluded from the ASET of the AT 14 as candidate sets.

As the AT 14 approaches the pico cell 24 in the direction 32 and reaches the location 36 shown in FIG. 3, the AT 14 begins to pick up the pilot set {24, f2}. Should the AT 14 continue to move in the direction 32, at some point in time, the pilot signal strength from the pilot set {24, f2} reaches above the PilotAdd threshold. In this embodiment, the AN 15 does not add the pilot set {24, f2} to the ASET of the AT 14 when the pilot signal strength of the pilot set {24, f2} exceeds the PilotAdd threshold, for reasons as stated earlier.

Suppose the AT 14 keeps on travelling in the direction 32 and reaches the location 38 as shown in FIG. 3. At this point in time, the AT 14 receives the pilot signal from the pilot set {24, f1} and the pilot signal strength exceeds the inclusion threshold PilotAdd. The AN 15 consequently adds both sets {24, f1} and {24, f2} to the ASET of the AT 14. In this example, the pilot set {24, f1} is the weaker of the sets {24, f1} and {24, f2}. In this exemplary embodiment, once the weaker set {24, f1} exceeds the PilotAdd threshold, both sets {24, f1} and {24, f2} are added to the AT's ASET. Thereafter, the AT 14 may use the communication channel with the pilot set {24, f2} for active communications on the frequency band centered at f2. In addition, the AT 14 may use the communication channel either with the pilot set {24, f1} or the pilot set {20, f1} on frequency band f1 as part of the hand-in process to the pico cell 24 and the sector 20, respectively. As the AT 14 moves closer to the pico cell 24, it may engage the communication channel with either the set {24, f1} or {24, f2}, or both, for active communications.

Suppose the AT 14 keeps on moving in the direction 32 and reaches the location 30. The pilot set {20, f1} drops below the pilot exclusion threshold PilotDrop. As a consequence, the AT 14, as instructed by the AN 15, drops the pilot set {20, f1} from the ASET as part of the hand-out process.

Described above are the set management processes when the AT 14 is entering the pico cell 24. The same holds true when the AT 14 exits the pico cell 24 except the above described process steps are reversed. For instance, at the location 30, the AT uses the channels with the pilot sets {24, f1} and {24, f2} for active communications, and the pilot set {20, f1} is not in its ASET. However, when the AT 14 reaches the location 40, the pilot signal strength from the pilot set {20, f1} exceeds the PilotAdd threshold and the AN 15 adds the pilot set {20, f1} to the ASET of the AT 14 as a candidate set. Even though the pilot set {20, f1} is added to the ASET, the AT 14 may still be in active communications with the communication channel with the set {24, f1} or {24, f2}, or both. However, as an alternative, the AT 14 can be in active communications with the communication channels with the pilot set {24, f2} on the frequency band centered at f2, and the pilot set {20, f1} on the frequency band centered at f1.

When the AT 14 travels away from the pico cell 24 from the location 30 to the location 38 in the opposite direction of the direction 32, the AN 15 drops both the pilot sets {24, f1} and {24, f2} from the ASET as candidate sets of the AT 14 when the signal strength of the weaker set {24, f1} drops below the pilot exclusion threshold PilotDrop as part of the hand-out process, i.e., around the location 38 as shown in FIG. 3. At the same time, when the pilot set {20, f1} reaches above the pilot inclusion threshold PilotAdd, the AN 15 adds the pilot set {20, f1} to the ASET of the AT 14. Thereafter, the AT 14 engages the sector 20 for active communications using the pilot set {20, f1} as part of the hand-in process.

In the embodiment described above, the criterion to add the pilot sets {24, f1} and {24, f2} of the pico cell 24 to the ASET of the AT 14 is when the weaker of the sets {24, f1} crosses the PilotAdd threshold, as identified by the cross mark 50 in FIG. 3. In another embodiment, the criterion to add the pilot sets {24, f1} and {24, f2} of the pico cell 24 to the ASET of the AT 14 is when the pilot strength of the currently serving sector or cell, {20, f1} in this case, drops below the PilotDrop threshold, as identified by the cross mark 52 shown in FIG. 3. Likewise, the criterion to delete the pilot sets {24, f1} and {24, f2} of the pico cell 24 from the ASET of the AT 14 is when the next available sector or cell, {20, f1} in this case, is above the PilotDrop threshold, i.e., above the cross mark 52 shown in FIG. 3. Phrased more generally, the criterion to add the pilot signal sets of an additional coverage zone into an AT's ASET in this embodiment is when all the sets of the zone exceed the PilotAdd threshold, and at the same time, the pilot strength of the currently sector or cell drops below the PilotDrop threshold. The same holds true when deleting the signal sets of the additional coverage zone from the AT's ASET except that the corresponding conditions for the criterion are opposite.

In yet another embodiment, the criterion to add the pilot sets {24, f1} and {24, f2} of the pico cell 24 to the ASET of the AT 14 is when the weaker of the sets {24, f1} is at a predetermined power level, e.g., 2 dB, above the signal strength of the pilot signal of the currently engaged sector or cell {20, f1}. In this case, the threshold level is as identified by the cross mark 54 shown in FIG. 3. As shown, the difference in power level, Δ pilot C/I, is set at 2 dB in this example. Likewise, the criterion to drop the pilot sets {24, f1} and {24, f2} of the pico cell 24 from the ASET of the AT 14 is when the power level of the weaker of the sets {24, f1}, is less than the predetermined power level, 2 dB in the example, than the corresponding power level of the next strongest pilot signal received by the AT 14, the set {20, f1} in this case. To practice this embodiment, the AN 15 needs to compare the power level of one designated pilot set from the pico cell 24 and the corresponding power level of the pilot signal set for the currently serving sector or cell.

In the previous description, various potential problems were identified for the scenario when the stronger of the pilot sets {24, f2} is prematurely added to the ASET of the AT 14. However, if adjacent channel interference is tolerable, or alternatively, adjacent channel interference is not a concern, in still yet another embodiment, the criterion to add both the pilot sets {24, f1} and {24, f2} of the pico cell 24 to the ASET of the AT 14 is when the stronger of the pilot sets {24, f2} is above the PilotAdd threshold, as shown by the cross mark 56 in FIG. 3. Preferably, the sets {24, f1} and {24, f2} are added at two stages. That is, the set {24, f2} is first added when its signal strength exceeds the PilotAdd threshold. Thereafter, the set {24, f1} is added when its signal strength also exceeds the PilotAdd threshold. Likewise, the criterion is to drop both the pilot sets {24, f1} and {24, f2} of the pico cell 24 from the ASET of the AT 14 is when the stronger of the pilot sets {24, f2} is below the PilotAdd threshold, also as shown by the cross mark 56 in FIG. 3. Again, it is preferred the sets {24, f1} and {24, f2} are dropped at two stages. That is, the set {24, f1} is first dropped when its signal strength is below the PilotDrop threshold. Thereafter, the set {24, f2} is dropped when its signal strength is also below the PilotDrop threshold. The circumstances that adjacent channel interferences are tolerable or not much of a concern can occur, for instance, when the frequency separation of the frequencies f1 and f2 is sufficiently far apart.

In the description above, the AT 14 is depicted as a multi-frequency device, i.e., a device capable of processing more than one frequency at a time. It should be noted that the user entity, such as the AT 14, can very well be a single-frequency device. In that case, to practice the above embodiments, the AT 14 needs to perform a frequency transition from the currently serving frequency to a different frequency.

Reference is now returned to FIGS. 1-3 for an exemplary illustration. Suppose the AT 14 approaches the pico cell 24 in the same direction 32 but the AT 14 in this example is a single-frequency device. At or near the location 28, the pilot set of the serving cell or sector is {20, f1}. As the AT 14 approaches the pico cell 24 in the direction 32, at some point in time, the single-frequency AT 14 can detect the pilot set signal {24, f1}. As described previously, the AT 14 constantly sends RUP messages to the AN 15 reporting received pilot signals and their strengths to the AN 15. As the signal strength of the pilot set {24, f1} meets the predetermined criterion in accordance with each of the first three embodiments described previously, the AN 15 sends a TCA message to the AT 14 to add the sets {24, f1} and {24, f2} to the AT's ASET. The AT 14 may then perform a frequency transition from f1 to f2 and engage the pico cell 24 for active communication via the frequency centered at f2.

When the single-frequency AT 14 exits the pico cell 24 toward the location 28, the above described process are substantially reversed and are not further elaborated.

The last embodiment mentioned above (i.e., the embodiment in which the designated signal set used for checking against a predetermined criterion is the stronger of the two sets in the additional coverage zone) is also applicable to the single-frequency AT 14. In that case, when the AT 14 is approaching the pico cell 24 from the location 28 in the direction 32, when the pilot signal {20, f1} of the currently serving sector or cell is sufficiently weak, the AT 14 needs to perform an off-frequency search. That is, the AT 14 needs to turn off the portion of the hardware currently processing the frequency centered at f1 and switch the portion of the hardware to process the frequency centered at f2. The off-frequency search need not be long, e.g., in the order of a few milliseconds, so as to minimize any data interruption of the on-going communication session. The search can be intermittently repetitive until a pilot set, such as the set {24, f2}, is found. Thereafter, the AT 14 can conduct the frequency transition as depicted earlier. When the single-frequency AT 14 exits the pico cell 24 toward the location 28, the above described process are substantially reversed and are also not further elaborated.

Figure 4:
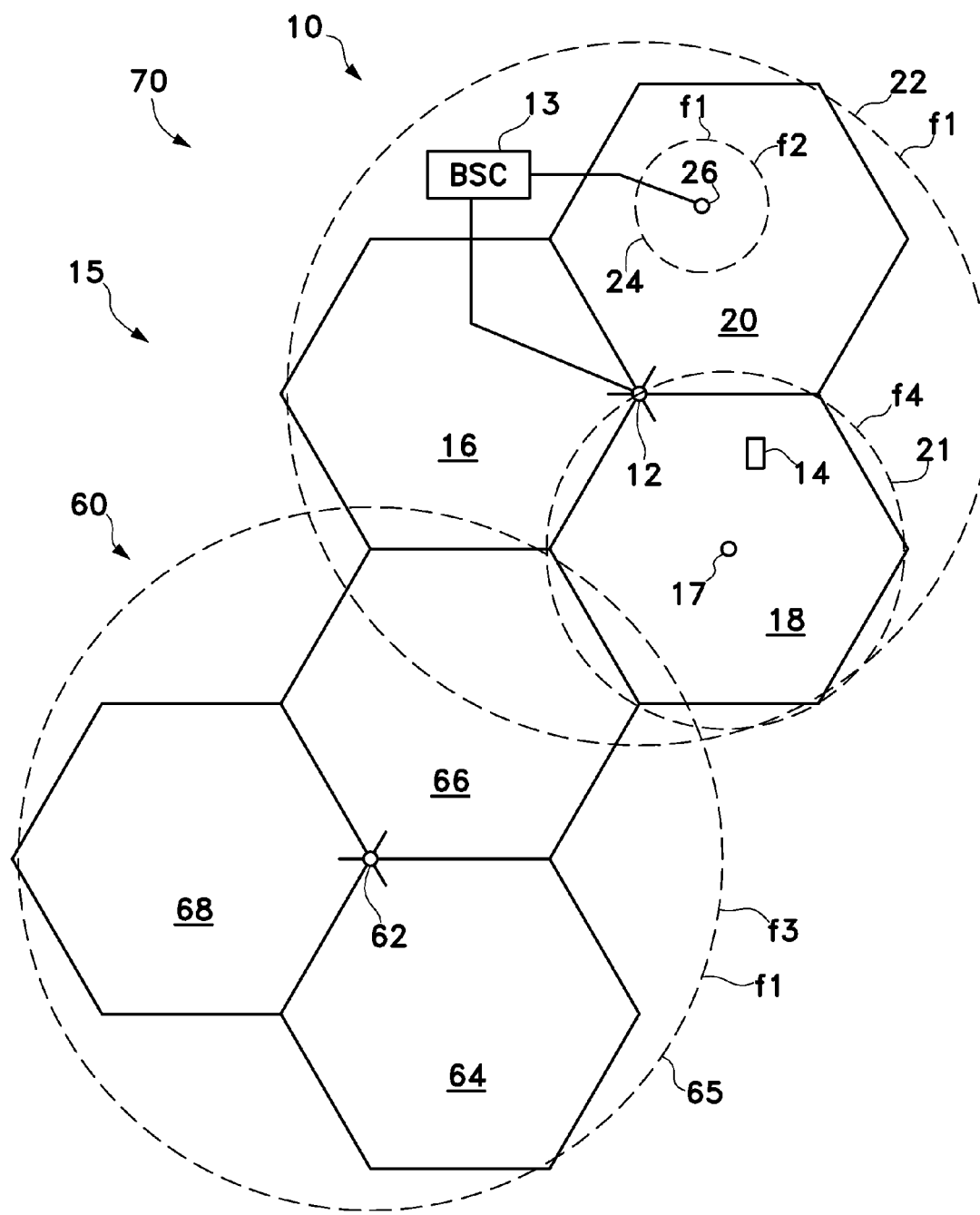
FIG. 4 is a schematic drawing which shows an exemplary arrangement in which a network with a non-uniform macro-cellular deployment coupled to a heterogeneous deployment.

The embodiments as described above are applicable to a heterogeneous deployment as shown and described in FIG. 1. As mentioned earlier, the above-described embodiments are also applicable to a macro-cellular deployment. Reference is now directed to FIG. 4 which schematically show a macro-cellular deployment system 60 coupled with the heterogeneous deployment system 10 as previously depicted.

In FIG. 4, the overall system is signified by the reference numeral 70. In the macro-cellular system 60, there is another infrastructure communication entity, a base station 62, having a transceiver capable of transceiving two frequencies with the user entities, such as the AT 14. In this example, the two frequencies are centered at f1 and f3. The base station 62 can be controlled by the BSC 13 or by another BSC. The base station 62 in this example also provides wireless communication coverage to three sectors, namely, sectors 64, 66 and 68. Each of the sectors 64, 66 and 68 is also assigned a unique PN sequence for communications with the user entities. Consequently, in the system 68, each sector provides two pilot signal sets. Specifically, the sector 66 provides the sets {66, f1} and {66, f3}. Likewise, the sector 64 provides the sets {64, f1} and {64, f3}. The sector 68 provides the sets {68, f1} and {68, f3}. All the sectors 64, 66 and 68 in the macro-cellular deployment system 60 are also characterized as additional coverage zones. The preexistent frequency in this example is centered at f1. The frequency centered at f3 is the frequency providing additional coverage. The designated area of coverage is the area denoted by the reference numeral 65 shown in FIG. 4.

Pilot set management for the macro-cellular deployment system 60 is substantially similar to that for the heterogeneous deployment system 10. For instance, pilot sets of each of the sectors 64, 66 and 68 can be treated similarly in terms of set management as for the corresponding sets of the pico cell 24 in operating the above described embodiments. For the sake of clarity and brevity, set management for the macro-cellular deployment system 60 is not further repeated.

Figure 5:
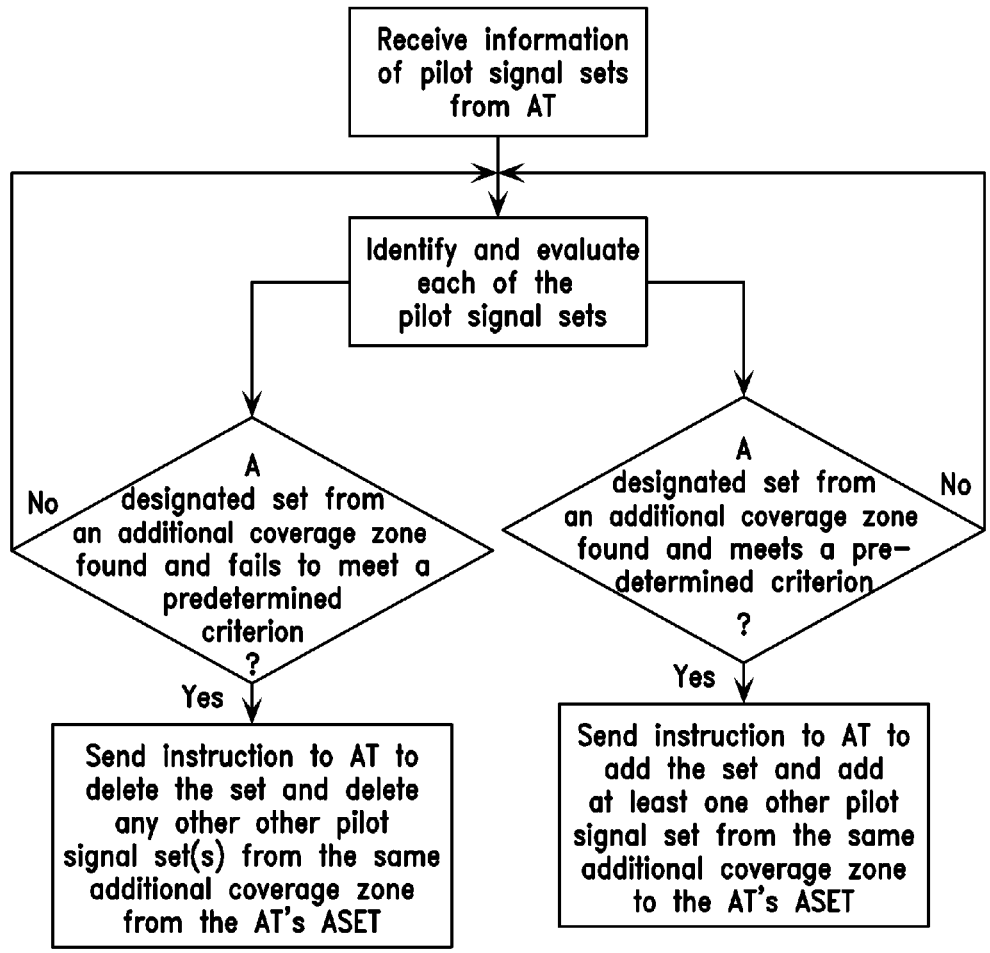
FIG. 5 is a flowchart illustrating the steps involved in the pilot signal set management processes as operated by an infrastructure entity in the exemplary embodiment.
Figure 6:
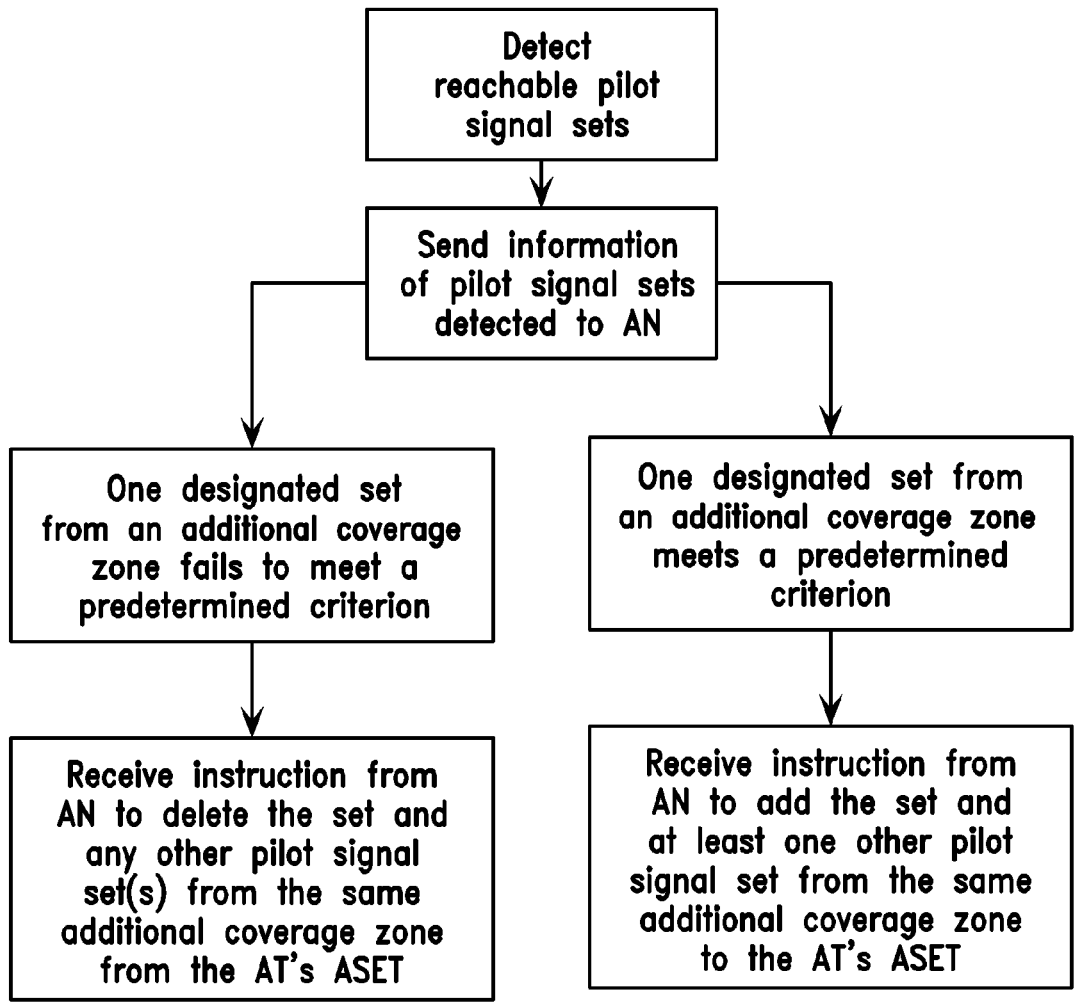
FIG. 6 is another flowchart illustrating the steps involved in the pilot signal set management processes as operated by a user entity in the exemplary embodiment.

FIGS. 5 and 6 are flowcharts generally summarize the set management processes for the infrastructure entity and the user entity, respectively, in a non-uniform macro-cellular deployment system or a heterogeneous deployment system, or any combination thereof. The criterion or criteria shown in the flowcharts are as described in the different embodiments above.

Figure 7:
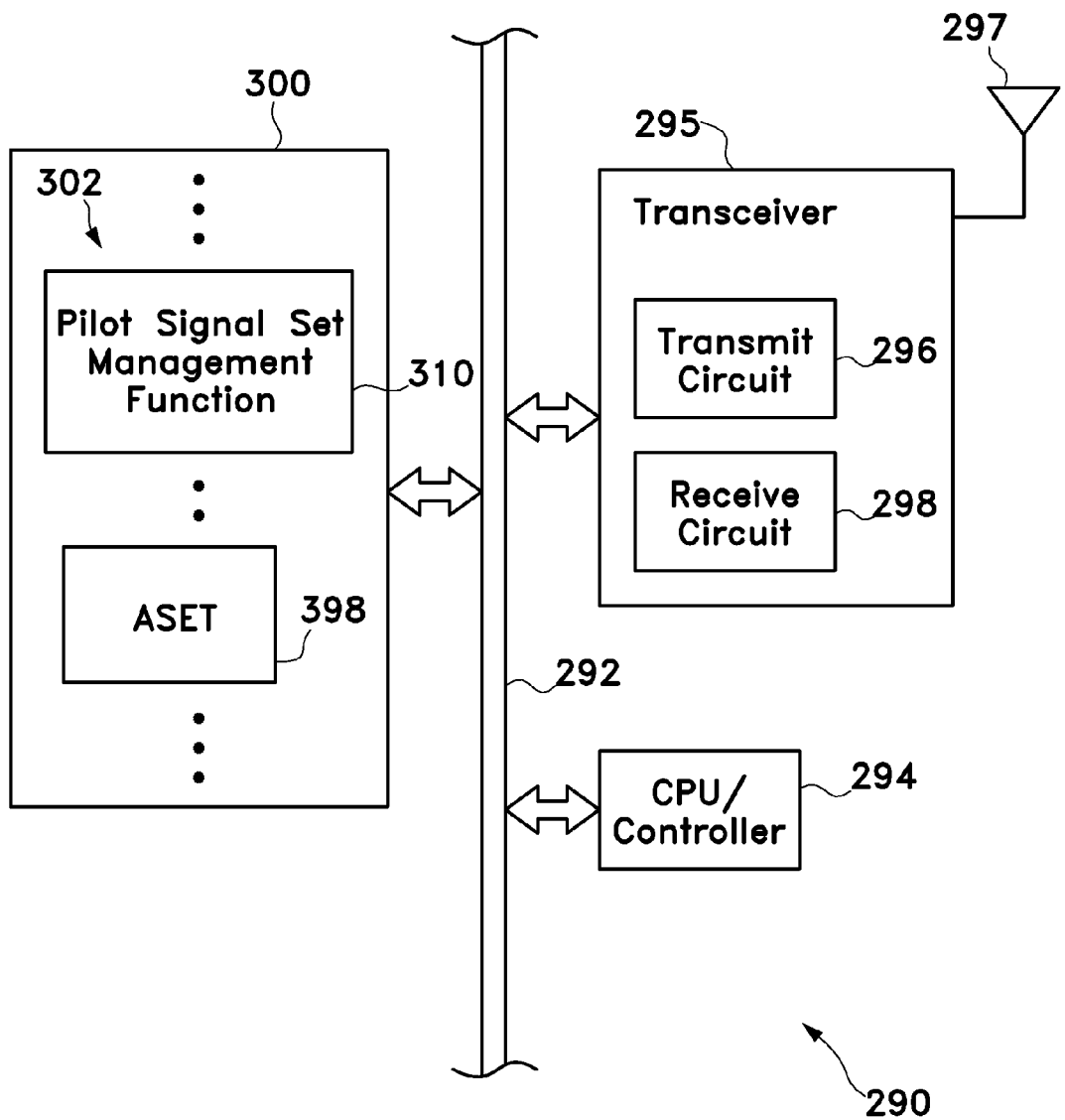
FIG. 7 is a schematic drawing which shows part of the hardware implementation of an apparatus for executing the pilot set management processes in the exemplary embodiment.

FIG. 7 shows part of the hardware implementation of an apparatus for executing set management processes as described above. The circuit apparatus is signified by the reference numeral 290 and can be implemented in a user entity, such as the AT 14, and other infrastructure entities, such as the BSC 13, the transceiver 26 and the base stations 12 and 62.

The apparatus 290 comprises a central data bus 292 linking several circuits together. The circuits include a CPU (Central Processing Unit) or a controller 294, a transceiver 295, and a memory unit 300.

The transceiver 295 is linked to an antenna 297. If the apparatus 290 does not rely on any wireless links for data exchanges, for example in the BSC 13 which may only use cables as data links communicating with other entities, the antenna 297 can be dispensed with.

The transceiver 295 includes a transmitter 296 and a receiver 298. The transceiver 297 basically processes and converts the high-frequency (HF) signals to the base-band signals, and vice versa, via the transmitter 296 and the receiver 298. The receiver 298 in turn processes and buffers received signals before sending out to the data bus 292. On the other hand, the transmitter 296 processes and buffers the data from the data bus 292 before sending out of the device 290.

For a single-frequency device 290, one transmitter 296 and one receiver 298 may be included in the transceiver 295. The CPU/controller 294 controls the proper timing by allocating the time slots for the data sensing and processing for the different frequency bands for the transceiver 295.

For a multi-frequency device 290, more than one transmitter 296 and more than one receiver 298 may be included in the transceiver 295 (not shown in FIG. 7). The CPU/controller 294 directs the multiple transmitters 296 and receivers 298 for detecting and/or processing of signals from the different frequency bands.

It should be noted that part of the transceiver 295 can be implanted as an external circuit, such as an external modem, pluggable to the apparatus 290.

In addition, the CPU/controller 294 performs the function of data management of the data bus 292 and the function of general data processing, including executing the instructional contents of the memory unit 300.

The memory unit 300 includes a set of modules and/or instructions generally signified by the reference numeral 302. In this embodiment, the modules/instructions include, among other things, a set management function 310. The function 310 includes computer instructions or code for executing the process steps as shown and described in FIGS. 1-6. Specific instructions particular to an entity can be selectively implemented in functions 310. For instance, if the apparatus 290 is part of an AT, among other things, instructions particular to the process steps of the AT as shown and described in FIGS. 1-4 and 6 can be coded in the functions 310. Similarly, if the apparatus 290 is part of a communication entity, for example an infrastructure entity such as the BSC 13 or the base station 12 or 62, process steps particular to that communication entity can be coded in the functions 310.

In addition, if the apparatus 290 is part of an AT, the ASET designated by the reference numeral 398 can be included in the memory 300 as shown in FIG. 7. As an alternative, the ASET 398 can be stored in one or more other memory units other than the unit 300.

In this embodiment, the memory unit 300 is a RAM (Random Access Memory) circuit. The exemplary functions, such as the handoff functions 308 and 310, are software routines, modules and/or data sets. The memory unit 300 can be tied to another memory circuit (not shown) which can either be of the volatile or nonvolatile type. As an alternative, the memory unit 300 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

In addition, the memory unit 300 can be a combination of ASIC and memory circuitry of the volatile type and/or nonvolatile type.

It should be further be noted that the inventive processes as described can also be coded as computer-readable instructions carried on any computer-readable medium known in the art. In this specification and the appended claims, the term "computer-readable medium" refers to any medium that participates in providing instructions to any processor, such as the CPU/controller 294 shown and described in the drawing figure of FIG. 6, for execution. Such a medium can be of the storage type and may take the form of a volatile or nonvolatile storage medium as also described previously, for example, in the description of the memory unit 300 in FIG. 7. Such a medium can also be of the transmission type and may include a coaxial cable, a copper wire, an optical cable, and the air interface carrying acoustic, electromagnetic or optical waves capable of carrying signals readable by machines or computers. The computer-readable medium can be part of a computer product separate from the apparatus 290.

Finally, other changes are possible within the scope of the invention. In the exemplary embodiments as described, an entity within the AN 15, such as the BSC 13 or the entities 12, 62, 17 or 26, is depicted as an entity that determines which pilot sets to be included in the ASET of the AT 14. It clearly is possible that the AT 14 can make such a determination. In that case, the determination function implementation, e.g., via software routines, can be installed in the AT 14 instead of the AN 15. Furthermore, in the exemplary embodiments, each additional coverage zone described for purposes of illustration as having two pilot signal sets. More than two pilot signal sets are clearly possible. Moreover, the AN 15 can selectively select any one of, any combination of, or all of the more than two pilot signal sets for adding to or deleting from the ASET of the AT 14. The AN 15 can make such a selection based on factors such as channel loading, channel conditions, etc. In addition, the operations of the various embodiments are depicted separately with respect to the heterogeneous deployment system 10 and the macro-cellular deployment system 60. The two systems 10 and 60 can clearly be combined. For example, the macro-cellular deployment system 60 can clearly include additional coverage zones such as the pico cell 24 and the hot spot 21. Other than as described above, any other logical blocks, circuits, and algorithm steps described in connection with the embodiment can be implemented in hardware, software, firmware, or combinations thereof. It will be understood by those skilled in the art that these and other changes in form and detail may be made therein without departing from the scope and spirit of the invention.

What is claimed is:

1. A method of communications operable by an infrastructure entity, comprising:
   receiving, from an access terminal, information associated with multiple pilot signal sets from an additional coverage zone, wherein the additional coverage zone operates under multiple frequency bands that respectively correspond to the multiple pilot signal sets to generate multicarrier coverage over one designated area;
   determining that a deployment associated with the additional coverage zone meets at least one predetermined condition if the multiple frequency bands that respectively correspond to the multiple pilot signal sets are centered at carrier frequencies having sufficient separation to not cause substantial adjacent channel interference; and
   instructing the access terminal to independently add individual pilot signal sets from the additional coverage zone that meet a predetermined criterion to an active set maintained at the access terminal in response to determining that the deployment associated with the additional coverage zone meets the at least one predetermined condition.

2. The method recited in claim 1, wherein the multiple pilot signal sets from the additional coverage zone comprise at least a first pilot signal set having a first signal strength that exceeds a predetermined threshold and a second pilot signal set having a second signal strength that does not exceed the predetermined threshold.

3. The method recited in claim 2, wherein instructing the access terminal to independently add the individual pilot signal sets from the additional coverage zone to the active set causes the access terminal to add the first pilot signal set to the active set.

4. The method recited in claim 3, wherein instructing the access terminal to independently add the individual pilot signal sets from the additional coverage zone to the active set maintained at the access terminal further causes the access terminal to subsequently add the second pilot signal set to the active set when the second signal strength crosses the predetermined threshold.

5. The method recited in claim 1, further comprising:
instructing the access terminal to independently drop the individual pilot signal sets from the additional coverage zone that were added to the active set in response to determining that the deployment associated with the additional coverage zone meets the at least one predetermined condition.

6. The method recited in claim 5, wherein instructing the access terminal to independently add and drop the individual pilot signal sets causes the access terminal to add a first pilot signal set from the additional coverage zone that has a signal strength above a predetermined threshold to the active set and subsequently drop the first pilot signal set from the active set when the signal strength associated therewith falls below the predetermined threshold.

7. The method recited in claim 1, further comprising:
constraining a power that the access terminal uses to transmit across adjacent carriers according to an allowable transmit power differential based at least in part on the deployment associated with the additional coverage zone and the separation between the center carrier frequencies associated with the multiple frequency bands.

8. The method recited in claim 1, wherein the deployment associated with the additional coverage zone comprises a heterogeneous deployment in which the additional coverage zone is deployed over at least one existent carrier that serves a geographic area that includes the additional coverage zone.

9. The method recited in claim 1, wherein the deployment associated with the additional coverage zone comprises a macro-cellular deployment in which multiple additional coverage zones operate under the multiple frequency bands that respectively correspond to the multiple pilot signal sets to generate multi-carrier coverage over a geographic area that includes the designated areas corresponding to each additional coverage zone.

10. The method recited in claim 1, wherein the multiple pilot signal sets each comprise an identifier associated with a sector or a cell that corresponds to the designated area and a center carrier frequency associated with the frequency band under which the sector or cell operates.

11. An infrastructure entity operable in a communication system, comprising:
means for receiving, from an access terminal, information associated with multiple pilot signal sets from an additional coverage zone, wherein the additional coverage zone operates under multiple frequency bands that respectively correspond to the multiple pilot signal sets to generate multi-carrier coverage over one designated area;
means for determining that a deployment associated with the additional coverage zone meets at least one predetermined condition if the multiple frequency bands that respectively correspond to the multiple pilot signal sets are centered at carrier frequencies having sufficient separation to not cause substantial adjacent channel interference; and
means for instructing the access terminal to independently add individual pilot signal sets from the additional coverage zone that meet a predetermined criterion to an active set maintained at the access terminal in response to determining that the deployment associated with the additional coverage zone meets the at least one predetermined condition.

12. The infrastructure entity recited in claim 11, wherein the multiple pilot signal sets from the additional coverage zone comprise at least a first pilot signal set having a first signal strength that exceeds a predetermined threshold and a second pilot signal set having a second signal strength that does not exceed the predetermined threshold.

13. The infrastructure entity recited in claim 12, wherein the means for instructing the access terminal to independently add the individual pilot signal sets from the additional coverage zone to the active set causes the access terminal to add the first pilot signal set to the active set.

14. The infrastructure entity recited in claim 13, wherein the means for instructing the access terminal to independently add the individual pilot signal sets from the additional coverage zone to the active set maintained at the access terminal further causes the access terminal to subsequently add the second pilot signal set to the active set when the second signal strength crosses the predetermined threshold.

15. The infrastructure entity recited in claim 11, further comprising:
means for instructing the access terminal to independently drop the individual pilot signal sets from the additional coverage zone that were added to the active set in response to determining that the deployment associated with the additional coverage zone meets the at least one predetermined condition.

16. The infrastructure entity recited in claim 15, wherein the means for instructing the access terminal to independently add and drop the individual pilot signal sets causes the access terminal to add a first pilot signal set from the additional coverage zone that has a signal strength above a predetermined threshold to the active set and subsequently drop the first pilot signal set from the active set when the signal strength associated therewith falls below the predetermined threshold.

17. The infrastructure entity recited in claim 11, further comprising:
means for constraining a power that the access terminal uses to transmit across adjacent carriers according to an allowable transmit power differential based at least in part on the deployment associated with the additional coverage zone and the separation between the center carrier frequencies associated with the multiple frequency bands.

18. The infrastructure entity recited in claim 11, wherein the deployment associated with the additional coverage zone comprises a heterogeneous deployment in which the additional coverage zone is deployed over at least one existent carrier that serves a geographic area that includes the additional coverage zone.

19. The infrastructure entity recited in claim 11, wherein the deployment associated with the additional coverage zone comprises a macro-cellular deployment in which multiple additional coverage zones operate under the multiple frequency bands that respectively correspond to the multiple pilot signal sets to generate multi-carrier coverage over a geographic area that includes the designated areas corresponding to each additional coverage zone.

20. The infrastructure entity recited in claim 11, wherein the multiple pilot signal sets each comprise an identifier associated with a sector or a cell that corresponds to the designated area and a center carrier frequency associated with the frequency band under which the sector or cell operates.

21. An apparatus operable in a communication system, comprising circuitry configured to:
- receive, from an access terminal, information associated with multiple pilot signal sets from an additional coverage zone, wherein the additional coverage zone operates under multiple frequency bands that respectively correspond to the multiple pilot signal sets to generate multi-carrier coverage over one designated area;
- determine that a deployment associated with the additional coverage zone meets at least one predetermined condition if the multiple frequency bands that respectively correspond to the multiple pilot signal sets are centered at carrier frequencies having sufficient separation to not cause substantial adjacent channel interference; and
- instruct the access terminal to independently add individual pilot signal sets from the additional coverage zone that meet a predetermined criterion to an active set maintained at the access terminal in response to determining that the deployment associated with the additional coverage zone meets the at least one predetermined condition.

22. A non-transitory computer-readable medium having computer-executable instructions recorded thereon, wherein executing the computer-executable instructions on one or more processors causes the one or more processors to:
- receive, from an access terminal, information associated with multiple pilot signal sets from an additional coverage zone, wherein the additional coverage zone operates under multiple frequency bands that respectively correspond to the multiple pilot signal sets to generate multi-carrier coverage over one designated area;
- determine that a deployment associated with the additional coverage zone meets at least one predetermined condition if the multiple frequency bands that respectively correspond to the multiple pilot signal sets are centered at carrier frequencies having sufficient separation to not cause substantial adjacent channel interference; and
- instruct the access terminal to independently add individual pilot signal sets from the additional coverage zone that meet a predetermined criterion to an active set maintained at the access terminal in response to determining that the deployment associated with the additional coverage zone meets the at least one predetermined condition.

23. A method of communications operable by an access terminal, comprising:
- sending information associated with multiple pilot signal sets from an additional coverage zone to an infrastructure entity, wherein the additional coverage zone operates under multiple frequency bands that respectively correspond to the multiple pilot signal sets to generate multi-carrier coverage over one designated area; and
- receiving, from the infrastructure entity, instructions to independently add individual pilot signal sets from the additional coverage zone that meet a predetermined criterion to an active set maintained at the access terminal, wherein the infrastructure entity sends the instructions to independently add the individual pilot signal sets from the additional coverage zone to the active set if the additional coverage zone has a deployment in which the multiple frequency bands that respectively correspond to the multiple pilot signal sets are centered at carrier frequencies having sufficient separation to not cause substantial adjacent channel interference.

24. The method recited in claim 23, wherein the multiple pilot signal sets from the additional coverage zone comprise at least a first pilot signal set having a first signal strength that exceeds a predetermined threshold and a second pilot signal set having a second signal strength that does not exceed the predetermined threshold.

25. The method recited in claim 24, further comprising:
- adding the first pilot signal set to the active set in response to receiving the instructions to independently add the individual pilot signal sets from the additional coverage zone that meet the predetermined criterion to the active set.

26. The method recited in claim 25, further comprising:
- adding the second pilot signal set to the active set in response to determining that the second signal strength subsequently crosses the predetermined threshold.

27. The method recited in claim 23, further comprising:
- receiving, from the infrastructure entity, instructions to independently drop the individual pilot signal sets from the additional coverage zone that were added to the active set.

28. The method recited in claim 27, further comprising:
- adding a first pilot signal set from the additional coverage zone that has a signal strength above a predetermined threshold to the active set in response to the instructions to independently add the individual pilot signal sets from the additional coverage zone that meet the predetermined criterion to the active set; and
- dropping the first pilot signal set from the active set in response to determining that the signal strength associated therewith subsequently falls below the predetermined threshold in response to the instructions to independently drop the individual pilot signal sets from the additional coverage zone that were added to the active set.

29. The method recited in claim 23, further comprising:
- constraining a transmit power used across adjacent carriers according to an allowable transmit power differential based at least in part on the deployment associated with the additional coverage zone and the separation between the center carrier frequencies associated with the multiple frequency bands.

30. The method recited in claim 23, wherein the deployment associated with the additional coverage zone comprises a heterogeneous deployment in which the additional coverage zone is deployed over at least one existent carrier that serves a geographic area that includes the additional coverage zone.

31. The method recited in claim 23, wherein the deployment associated with the additional coverage zone comprises a macro-cellular deployment in which multiple additional coverage zones operate under the multiple frequency bands that respectively correspond to the multiple pilot signal sets to generate multi-carrier coverage over a geographic area that includes the designated areas corresponding to each additional coverage zone.

32. The method recited in claim 23, wherein the multiple pilot signal sets each comprise an identifier associated with a sector or a cell that corresponds to the designated area and a center carrier frequency associated with the frequency band under which the sector or cell operates.

33. The method recited in claim 23, wherein the access terminal comprises a multi-frequency device that can process multiple frequencies at a time.

34. The method recited in claim 23, wherein the access terminal comprises a single-frequency device that can process one frequency at a time.

35. The method recited in claim 34, further comprising monitoring the multiple pilot signal sets from the additional coverage zone, wherein monitoring the multiple pilot signal sets from the additional coverage zone comprises:

switching from a current serving frequency to a different frequency;

detecting an individual pilot signal set from the additional coverage zone; and performing a frequency transition from the current serving frequency to a center carrier frequency associated with the detected pilot signal set from the additional coverage zone in response to determining that the detected pilot signal set has a signal strength that exceeds a predetermined threshold.

36. An access terminal operable in a communication system, comprising:

means for sending information associated with multiple pilot signal sets from an additional coverage zone to an infrastructure entity, wherein the additional coverage zone operates under multiple frequency bands that respectively correspond to the multiple pilot signal sets to generate multi-carrier coverage over one designated area; and means for receiving, from the infrastructure entity, instructions to independently add individual pilot signal sets from the additional coverage zone that meet a predetermined criterion to an active set maintained at the access terminal, wherein the infrastructure entity sends the instructions to independently add the individual pilot signal sets from the additional coverage zone to the active set if the additional coverage zone has a deployment in which the multiple frequency bands that respectively correspond to the multiple pilot signal sets are centered at carrier frequencies having sufficient separation to not cause substantial adjacent channel interference.

37. The access terminal recited in claim 36, wherein the multiple pilot signal sets from the additional coverage zone comprise at least a first pilot signal set having a first signal strength that exceeds a predetermined threshold and a second pilot signal set having a second signal strength that does not exceed the predetermined threshold.

38. The access terminal recited in claim 37, further comprising:

means for adding the first pilot signal set to the active set in response to receiving the instructions to independently add the individual pilot signal sets from the additional coverage zone that meet the predetermined criterion to the active set.

39. The access terminal recited in claim 38, further comprising:

means for adding the second pilot signal set to the active set in response to determining that the second signal strength subsequently crosses the predetermined threshold.

40. The access terminal recited in claim 36, further comprising:

means for receiving, from the infrastructure entity, instructions to independently drop the individual pilot signal sets from the additional coverage zone that were added to the active set.

41. The access terminal recited in claim 40, further comprising:

means for adding a first pilot signal set from the additional coverage zone that has a signal strength above a predetermined threshold to the active set in response to the instructions to independently add the individual pilot signal sets from the additional coverage zone that meet the predetermined criterion to the active set; and means for dropping the first pilot signal set from the active set in response to determining that the signal strength associated therewith subsequently falls below the predetermined threshold in response to the instructions to independently drop the individual pilot signal sets from the additional coverage zone that were added to the active set.

42. The access terminal recited in claim 36, further comprising:

means for constraining a transmit power used across adjacent carriers according to an allowable transmit power differential based at least in part on the deployment associated with the additional coverage zone and the separation between the center carrier frequencies associated with the multiple frequency bands.

43. The access terminal recited in claim 36, wherein the deployment associated with the additional coverage zone comprises a heterogeneous deployment in which the additional coverage zone is deployed over at least one existent carrier that serves a geographic area that includes the additional coverage zone.

44. The access terminal recited in claim 36, wherein the deployment associated with the additional coverage zone comprises a macro-cellular deployment in which multiple additional coverage zones operate under the multiple frequency bands that respectively correspond to the multiple pilot signal sets to generate multi-carrier coverage over a geographic area that includes the designated areas corresponding to each additional coverage zone.

45. The access terminal recited in claim 36, wherein the multiple pilot signal sets each comprise an identifier associated with a sector or a cell that corresponds to the designated area and a center carrier frequency associated with the frequency band under which the sector or cell operates.

46. The access terminal recited in claim 36, wherein the access terminal comprises a multi-frequency device that can process multiple frequencies at a time.

47. The access terminal recited in claim 36, wherein the access terminal comprises a single-frequency device that can process one frequency at a time.

48. The access terminal recited in claim 47, further comprising means for monitoring the multiple pilot signal sets from the additional coverage zone, wherein the means for monitoring the multiple pilot signal sets from the additional coverage zone comprises:

means for switching from a current serving frequency to a different frequency;

means for detecting an individual pilot signal set from the additional coverage zone; and means for performing a frequency transition from the current serving frequency to a center carrier frequency associated with the detected pilot signal set from the additional coverage zone in response to determining that the detected pilot signal set has a signal strength that exceeds a predetermined threshold.

49. An apparatus operable in a communication system, comprising circuitry configured to:

send information associated with multiple pilot signal sets from an additional coverage zone to an infrastructure entity, wherein the additional coverage zone operates under multiple frequency bands that respectively correspond to the multiple pilot signal sets to generate multi-carrier coverage over one designated area; and receive, from the infrastructure entity, instructions to independently add individual pilot signal sets from the additional coverage zone that meet a predetermined criterion to an active set maintained at the apparatus, wherein the infrastructure entity sends the instructions to independently add the individual pilot signal sets from the additional coverage zone to the active set if the additional coverage zone has a deployment in which the multiple frequency bands that respectively correspond to the multiple pilot signal sets are centered at carrier frequencies having sufficient separation to not cause substantial adjacent channel interference.

50. A non-transitory computer-readable medium having computer-executable instructions recorded thereon, wherein executing the computer-executable instructions on an access terminal causes the access terminal to:
   send information associated with multiple pilot signal sets from an additional coverage zone to an infrastructure entity, wherein the additional coverage zone operates under multiple frequency bands that respectively correspond to the multiple pilot signal sets to generate multi-carrier coverage over one designated area; and
   receive, from the infrastructure entity, instructions to independently add individual pilot signal sets from the additional coverage zone that meet a predetermined criterion to an active set maintained at the access terminal, wherein the infrastructure entity sends the instructions to independently add the individual pilot signal sets from the additional coverage zone to the active set if the additional coverage zone has a deployment in which the multiple frequency bands that respectively correspond to the multiple pilot signal sets are centered at carrier frequencies having sufficient separation to not cause substantial adjacent channel interference.

* * * * *